United States Patent
Lee et al.

(10) Patent No.: US 8,233,748 B2
(45) Date of Patent: Jul. 31, 2012

(54) IMAGE-RESOLUTION-IMPROVEMENT APPARATUS AND METHOD

(75) Inventors: Ho-young Lee, Suwon-si (KR); Jan P. Allebach, West Lafayette, IN (US); Xiaojun Feng, West Lafayette, IN (US); Yousun Bang, Seoul (KR); Heui-keun Choh, Seoul (KR)

(73) Assignees: Samsung Electronics Co., Ltd., Suwon-Si (KR); Purdue Research Foundation, West Lafayette, IN (US)

( * ) Notice: Subject to any disclaimer, the term of this patent is extended or adjusted under 35 U.S.C. 154(b) by 1380 days.

(21) Appl. No.: 11/878,147

(22) Filed: Jul. 20, 2007

(65) Prior Publication Data

US 2009/0022402 A1    Jan. 22, 2009

(51) Int. Cl.
G06K 9/66 (2006.01)
G06K 9/32 (2006.01)
G09G 5/00 (2006.01)
H04N 5/44 (2006.01)
H04N 1/393 (2006.01)

(52) U.S. Cl. ........ 382/300; 382/195; 382/298; 382/299; 345/660; 345/670; 345/671; 348/561; 358/451

(58) Field of Classification Search .................. 382/195, 382/300, 298, 299
See application file for complete search history.

(56) References Cited

U.S. PATENT DOCUMENTS

| | | | |
|---|---|---|---|
| 5,191,416 A | 3/1993 | Dickson et al. | |
| 5,742,710 A | 4/1998 | Hsu et al. | |
| 6,714,693 B1 * | 3/2004 | Miyake | 382/300 |
| 6,927,804 B2 * | 8/2005 | Adams et al. | 348/624 |
| 7,206,027 B2 * | 4/2007 | De Haan et al. | 348/448 |
| 7,352,910 B2 * | 4/2008 | Kanamori et al. | 382/254 |
| 7,535,482 B2 * | 5/2009 | Lee et al. | 345/690 |
| 2008/0291332 A1 * | 11/2008 | Messing et al. | 348/625 |

FOREIGN PATENT DOCUMENTS

| | | |
|---|---|---|
| JP | 2003-333543 | 11/2003 |
| JP | 2004-152148 | 5/2004 |
| KR | 10-2006-0027936 | 4/2001 |
| KR | 10-2006-0019994 | 3/2006 |

OTHER PUBLICATIONS

Shen et al. "Motion Adaptive Deinterlacing of Video Data with Texture Detection", IEEE Transactions on Consumer Electronics, vol. 52 Issue 4, Jan. 8, 2007, pp. 1403-1408.*
Korean Patent Office Action, mailed Mar. 31, 2008 and issued in corresponding Korean Patent Application No. 10-2007-0079081.

* cited by examiner

Primary Examiner — Brian Q Le
Assistant Examiner — Jose M Torres
(74) Attorney, Agent, or Firm — Staas & Halsey LLP (57) ABSTRACT

Provided is an image-resolution-improvement apparatus and method which can increase the resolution of an input image at a high magnification to thereby obtain a high-quality final image. The apparatus includes a textured-region-detection unit to detect a texture region in an input image; and a final-image-generation unit to synthesize a first intermediate image and a second intermediate image, which are obtained by applying different interpolation techniques to the texture region and a non-texture region excluding the texture region and generating a final image.

30 Claims, 10 Drawing Sheets

IMAGE-RESOLUTION-IMPROVEMENT APPARATUS AND METHOD

BACKGROUND

1. Field

Embodiments relate to an image-resolution-improvement apparatus and method, and, more particularly, to an image-resolution-improvement apparatus and method which can increase the resolution of an input image at a high magnification to thereby obtain a high-quality final image.

2. Description of the Related Art

Image resolution improvement technology may be broadly classified into a method of using linear filtering and a method of using non-linear filtering.

Linear filtering methods include methods of converting image resolution using linear filtering techniques such as bilinear interpolation and cubic interpolation. When linear filtering technology is used, high-frequency components of an input image are insufficiently reproduced in a resolution expansion process. Consequently, the definition, i.e., quality, of a final image is significantly undermined. In order to address this problem, a technology for outputting a high-definition signal has been suggested. The suggested technology applies peaking to a low-resolution signal to identify potential edge pixels, up-converts a peaked video signal, and outputs a high-definition signal by sequentially performing edge pixel detection, edge linking and luminance transient improvement. However, the suggested technology requires a large amount of computation and a complicated hardware structure.

Non-linear filtering technology can be divided into a directional interpolation method and a content-based interpolation method. The directional interpolation method performs interpolation using edge information of an image in a direction parallel to an edge direction, thereby preventing blurring of edge components. The content-based interpolation method calculates optimized scaling filter coefficients in a prior learning process, and performs resolution conversion by selecting a learned filter coefficient according to the local characteristics of an input image. While the above methods show relatively favorable results in the edge region of an image, it is difficult to expect high image quality in the fine texture regions of the image.

SUMMARY

Additional aspects and/or advantages will be set forth in part in the description which follows and, in part, will be apparent from the description, or may be learned by practice of the invention.

Aspects of the embodiments discussed herein provide an image-resolution-improvement apparatus and method which can increase the resolution of an input image at a high magnification to thereby obtain a high-quality final image.

However, the aspects of the embodiments are not restricted to the one set forth herein. The above and other aspects of the embodiments will become more apparent to one of ordinary skill in the art to which the embodiments pertains by referencing the detailed description of the present invention given below.

According to an aspect of the embodiments, there is provided an image-resolution-improvement apparatus including: a textured-region-detection unit which detects a texture region in an input image; and a final-image-generation unit to synthesize synthesizes a first intermediate image and a second intermediate image, which are obtained by applying different interpolation techniques to the texture region and a non-texture region excluding the texture region, and generating a final image.

According to another aspect of the embodiments, there is provided an image-resolution-improvement method including: detecting a texture region in an input image; and synthesizing a first intermediate image and a second intermediate image, which are obtained by applying different interpolation techniques to the texture region and a non-texture region excluding the texture region, and generating a final image.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

The embodiments will be described more fully in the following with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings indicate like elements, and thus their description has been omitted.

Hereinafter, the embodiments will be described with reference to block diagrams or flowchart illustrations. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus, such that the instructions, which execute via the processor of the computer or other programmable data processing apparatus, create a mechanism for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction processing that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Figure 1:
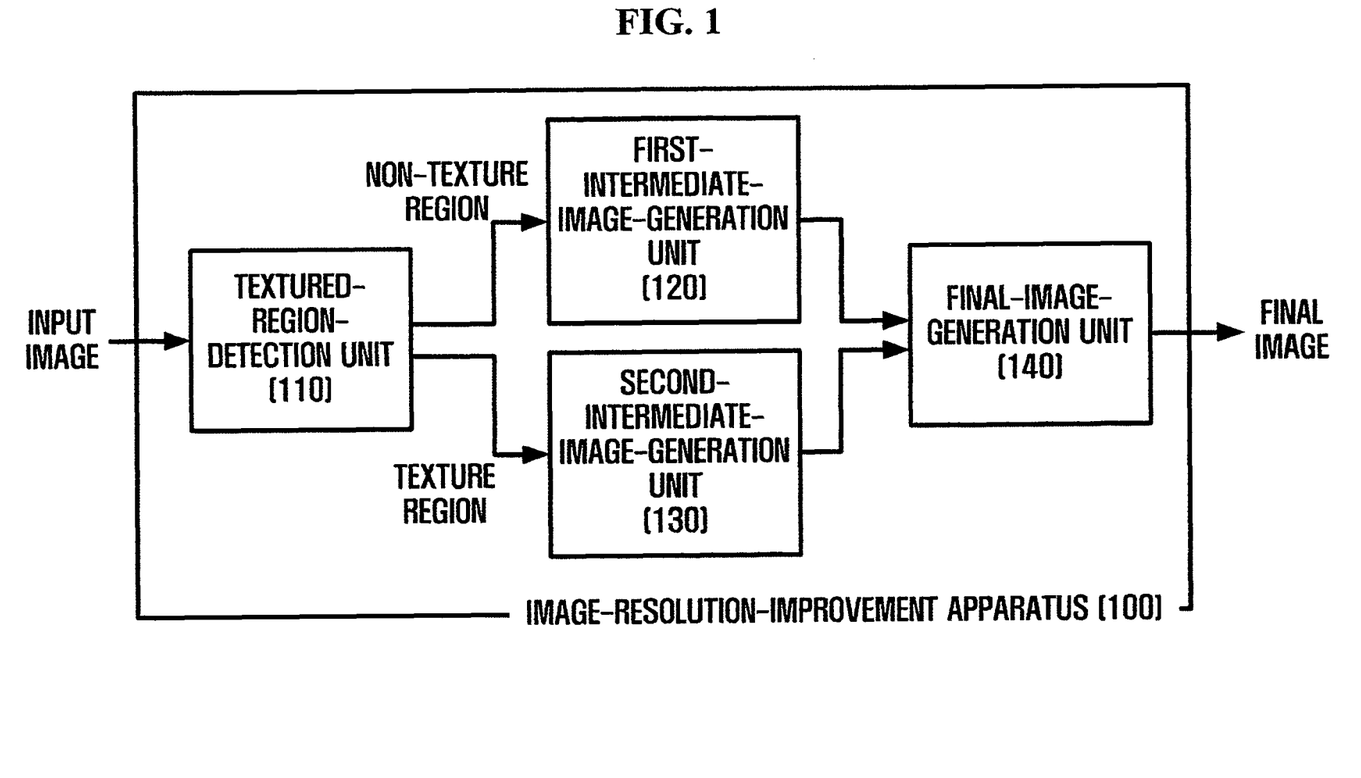
FIG. 1 is a block diagram of an image-resolution-improvement apparatus according to an exemplary embodiment.

FIG. 1 is a block diagram of an image-resolution-improvement apparatus 100 according to an exemplary embodiment. Referring to FIG. 1, the image-resolution-improvement apparatus 100 includes a textured-region-detection unit 110, a first-intermediate-image-generation unit 120, a second-intermediate-image-generation unit 130, and a final-image-generation unit 140.

Figure 2A:
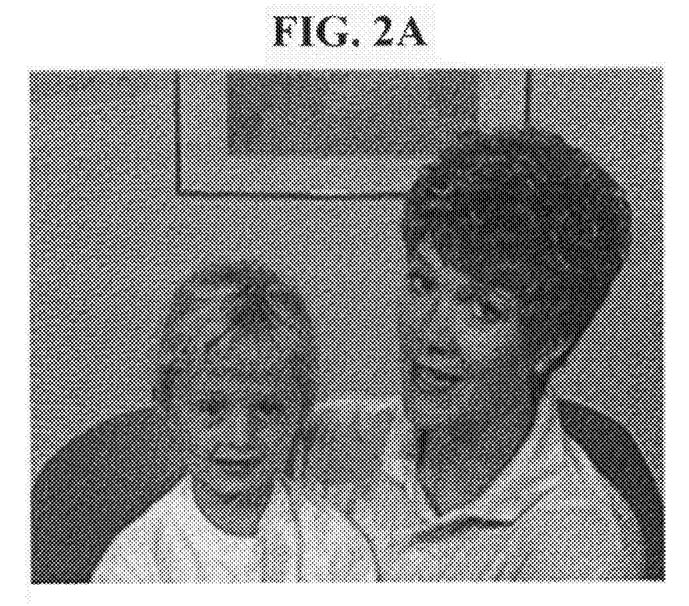
FIG. 2A illustrates an example of an input image.
Figure 2B:
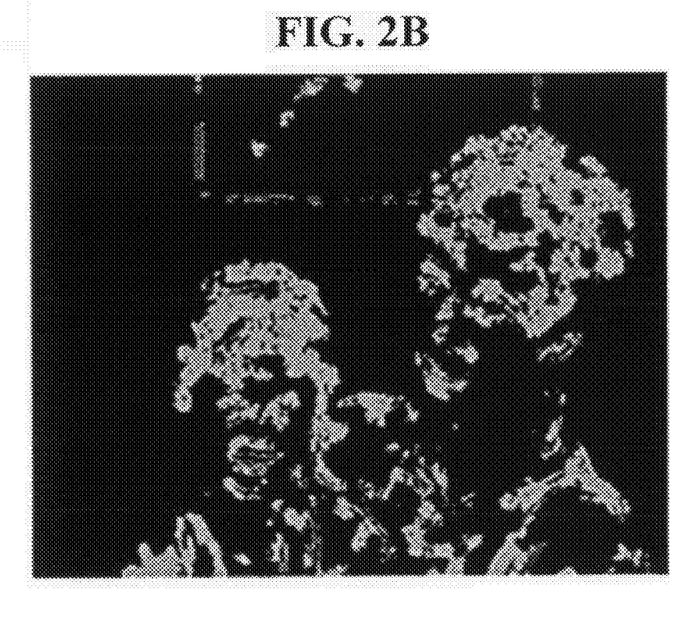
FIG. 2B illustrates a texture region detected in the input image of FIG. 2A.

The textured-region-detection unit 110 may detect a texture region in an input image. A texture region refers to a region with a particular texture, such as a lawn or a person's hair, in an input image. According to an exemplary embodiment, the textured-region-detection unit 110 may detect a texture region based on the number of pixels whose luminance differences from a central pixel in a window mask of a predetermined size are less than a predetermined threshold value. Specifically, the difference between the luminance of a central pixel $P_i$ and that of each of its adjacent pixels within an M×N window mask is calculated (M=N or not). If the number of adjacent pixels, whose luminance differences from the central pixel $P_i$ are less than a first threshold value (e.g. 20), is greater than a second threshold value (e.g. 0.2×N×N), the textured-region-detection unit 110 may classify the central pixel $P_i$ as a pixel (hereinafter, referred to as a "texture pixel") included in the texture region. FIG. 2A illustrates an example of an input image, and FIG. 2B illustrates a texture region detected in the input image of FIG. 2A using the detection method described above. Referring to FIG. 2B, the texture region, such as hair, is detected in the input image illustrated in FIG. 2A.

The first-intermediate-image-generation unit 120 may apply edge directional interpolation technology to a non-texture region and generate a first intermediate image. The first interpolation image generation unit 120 will be described in detail later with reference to FIGS. 3 through 9.

The second-intermediate-image-generation unit 130 may apply residual error estimation-based interpolation to the texture region, and generate a second intermediate image. The second-intermediate-image-generation unit 130 will be described in detail later with reference to FIGS. 10 and 11.

The final-image-generation unit 140 may synthesize the first intermediate image generated by the first-intermediate-image-generation unit 120 with the second intermediate image generated by the second-intermediate-image-generation unit 130 and generate a final image with better resolution than that of the input image.

The first-intermediate-image-generation unit 120 illustrated in FIG. 1 is be described with reference to FIGS. 3 through 9 in the following.

Figure 3:
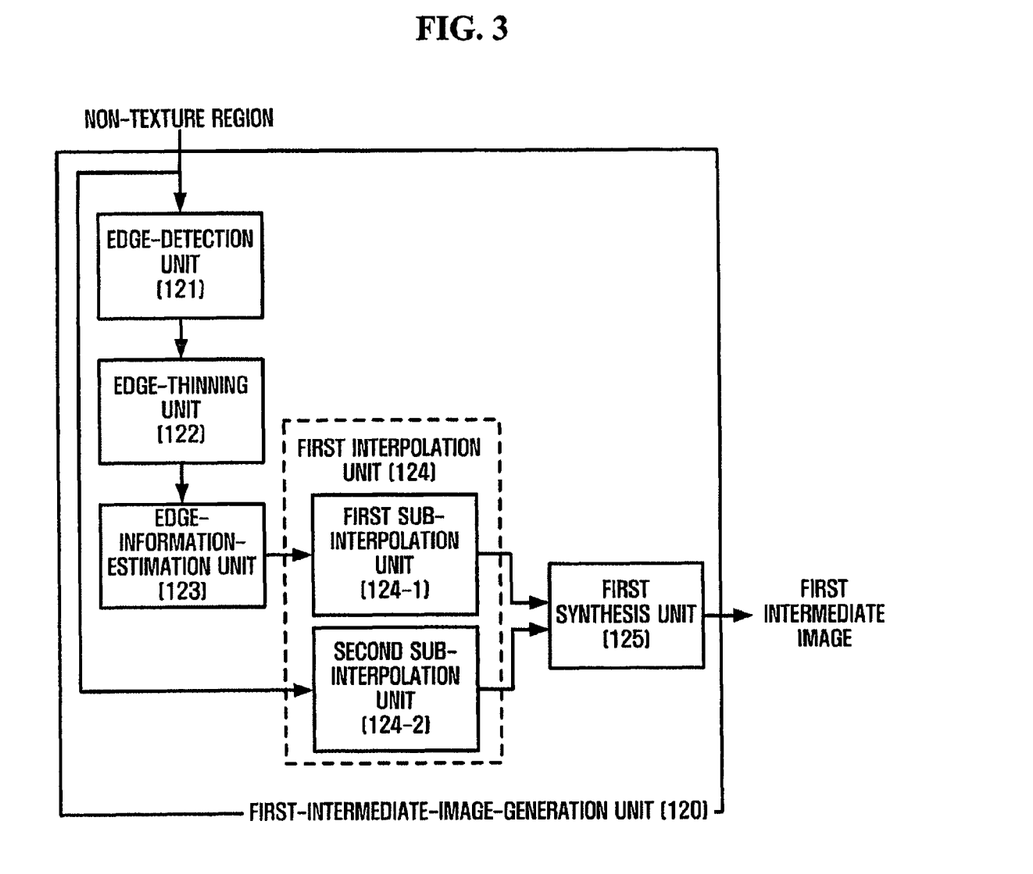
FIG. 3 is a detailed block diagram of the first-intermediate-image-generation unit illustrated in FIG. 1.

FIG. 3 is a detailed block diagram of the first-intermediate-image-generation unit 120 illustrated in FIG. 1. Referring to FIG. 3, the first-intermediate-image-generation unit 120 may include an edge detection unit 121, an edge-thinning unit 122, an edge-information-estimation unit 123, a first interpolation unit 124, and a first synthesis unit 125.

Figure 4:
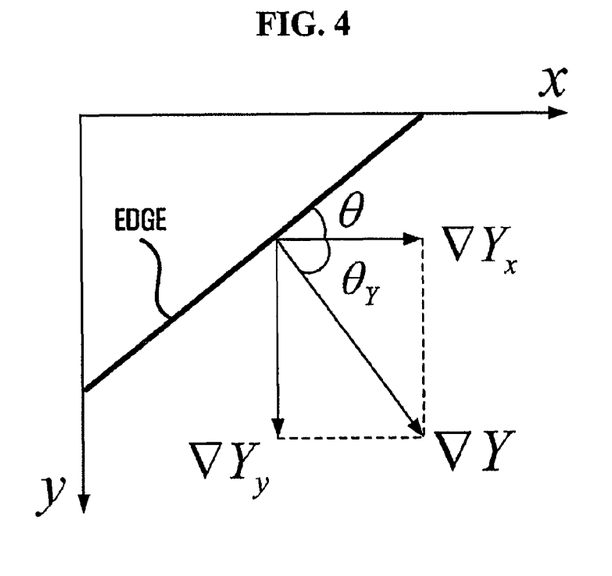
FIG. 4 is a diagram illustrating an edge gradient.
Figure 5:
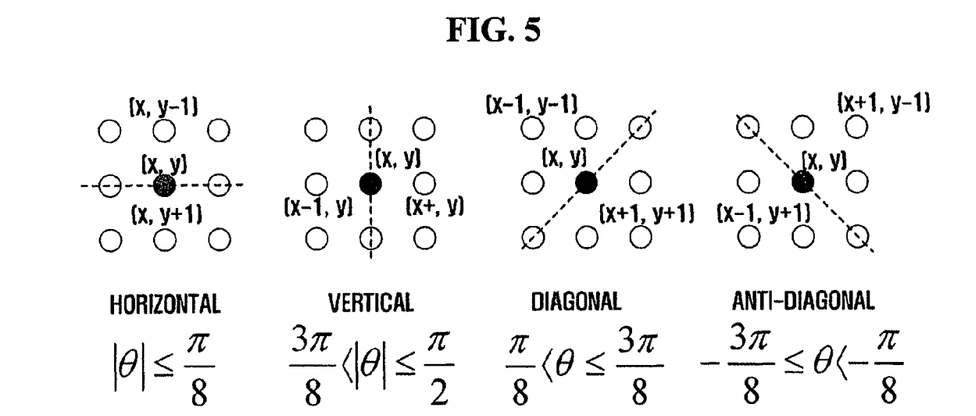
FIG. 5 is a diagram illustrating a pixel group in each direction of an edge pixel, in which edge gradient magnitudes of pixels in the pixel group can be compared to that of the edge pixel for edge thinning.

The edge detection unit 121 may detect edge pixels in a non-texture region. To this end, the edge detection unit 121 may use a Sobel edge operator. A method of detecting edge pixels is described in more detail in the following. If the Sobel operator is used, a horizontal edge gradient component $\nabla Y_x$ and a vertical edge gradient component $\nabla Y_y$ of a pixel can be calculated as illustrated in FIG. 4. Once the horizontal edge gradient component $\nabla Y_x$ and the vertical edge gradient component $\nabla Y_y$ of the pixel are calculated, the edge detection unit 121 may calculate an edge gradient magnitude of the pixel using the horizontal edge gradient component $\nabla Y_x$ and the vertical edge gradient component $\nabla Y_y$ of the pixel. An edge gradient magnitude $|\nabla Y|$ denotes the degree to which an edge pixel slopes, and is given by Equation (1).

$$|\nabla Y| = \sqrt{\nabla Y_x^2 + \nabla Y_y^2} \qquad (1)$$

If a value of the edge gradient magnitude of the pixel, which has been calculated using Equation (1), exceeds a predetermined threshold value, the edge detection unit 121 may determine the pixel to be an edge pixel. According to the above method, a relatively thick edge may be detected. In order to estimate the accurate positions of edges in a high-magnification image in the process of converting the resolution of the input image, it is required to detect an edge pixel (hereinafter, referred to as a 'final edge pixel'), which plays an important role in edge position estimation, among the detected edge pixels. This process is referred to as 'edge thinning,' which may be performed by the edge-thinning unit 122 to be described later.

Referring to FIG. 3, the edge-thinning unit 122 may thin edges detected by the edge detection unit 121. That is, the edge-thinning unit 122 may detect a final edge pixel from the edge pixels detected by the edge detection unit 121. In order to detect the final edge pixel, the edge-thinning unit 122 may obtain a gradient direction component θ of an edge pixel. The gradient direction component θ of the edge pixel may be calculated using a horizontal edge gradient component $\nabla Y_x$ and a vertical edge gradient component $\nabla Y_y$ of the edge pixel as in Equation (2).

$$\theta_Y = \arctan\left(\frac{\nabla Y_y}{\nabla Y_x}\right), \qquad (2)$$

$$\theta = \begin{cases} \theta_Y + \dfrac{\pi}{2} & \text{if } \theta_Y \leq 0 \\ \theta_Y - \dfrac{\pi}{2} & \text{otherwise} \end{cases}.$$

If an absolute value of the gradient direction component θ of the edge pixel calculated using Equation (2) is π/8 or less, the edge pixel may be classified as a horizontal edge pixel. If a value of the gradient direction component θ of the edge pixel is greater than π/8 and 3π/8 or less, the edge pixel may be classified as a diagonal edge pixel. If the absolute value of the gradient direction component θ of the edge pixel is greater than 3π/8 and π/2 or less, the edge pixel may be classified as a horizontal edge pixel. If the value of the gradient direction component θ of the edge pixel is −3π/8 or greater and less than −π/8, the edge pixel may be classified as a non-diagonal edge pixel.

After calculating the gradient direction component of the edge pixel, the edge-thinning unit 122 may compare an edge gradient magnitude of the edge pixel to that of each of a plurality of pixels existing in a direction of the edge pixel. For example, referring to FIG. 5, the edge-thinning unit 122 may compare an edge gradient magnitude of an edge pixel to that of each of two pixels disposed on both sides of the edge pixel among pixels existing in a direction of the edge pixel. If the edge gradient magnitude of the edge pixel, i.e., the central pixel, is greater than those of the two pixels, the edge-thinning unit 122 may determine the edge pixel to be a final edge pixel.

The edge-information-estimation unit 123 may estimate direction information and position information of the final edge pixel in the input image with converted resolution. A method of estimating the position information and the direction information of the final edge pixel will now be described in more detail with reference to FIGS. 6 through 8.

Figure 6:
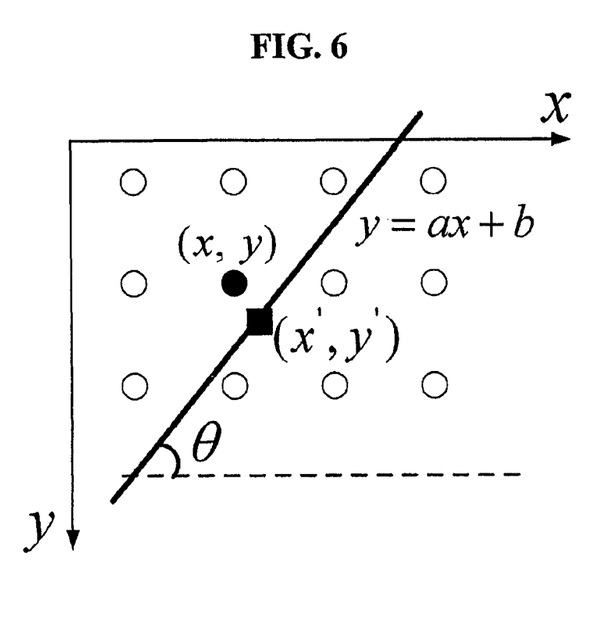
FIG. 6 is a diagram illustrating a change in the position of a final edge pixel according to a change in resolution of an input image.
Figure 7:
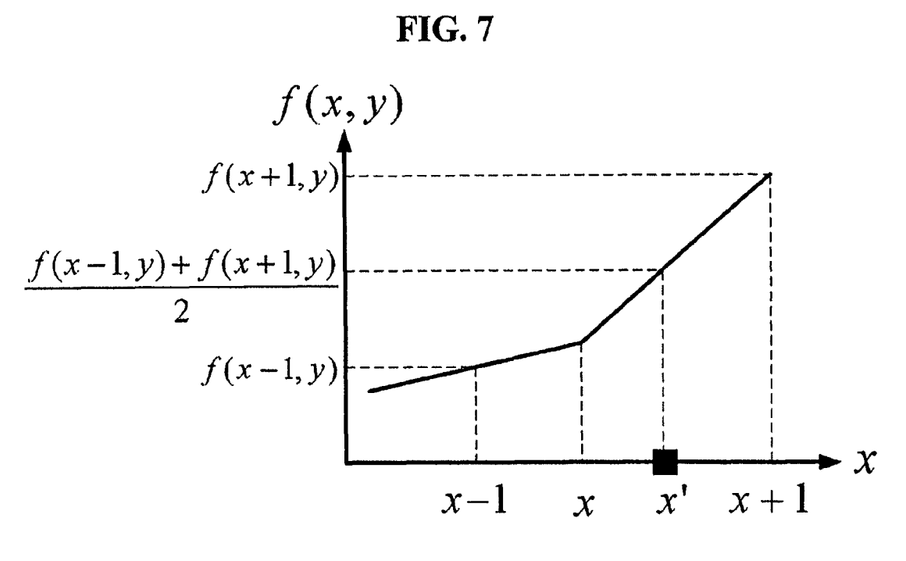
FIG. 7 is a diagram illustrating a method of estimating the position of an edge in an image with a converted resolution based on luminances of pixels existing horizontally from a final edge.

FIG. 6 is a diagram illustrating a change in the position of a final edge pixel from (x, y) to (x', y') according to an increase in resolution of an input image. A gradient direction component of the final edge pixel is maintained unchanged before and after the resolution of the input image is converted. However, the position information of the final edge pixel is changed from (x, y) to (x', y'). In this case, a value x' in the direction of an x-axis in the converted position information (x', y') of the final edge pixel may be calculated based on luminance of the final edge pixel and those of pixels horizontally arranged from the final edge pixel as in Equation (3):

$$x' = x + \frac{f' - f(x, y)}{f(x+1, y) - f(x, y)}, \quad (3)$$

$$f' = \frac{f(x-1, y) + f(x+1, y)}{2}$$

where f' indicates the luminance at x'. Referring to FIG. 7, f" may be determined to be the mean of luminances of pixels existing on both horizontal sides of the final edge pixel. That is, f' may be determined to the mean of the luminance of (x−1, y) and that of (x+1, y).

Similarly, the value y' in the converted position information (x', y') of the final edge pixel may be calculated based on the luminance of the final edge pixel and those of pixels vertically existing on both sides of the final edge pixel.

The position information of the final edge pixel estimated using Equation (3) may be modeled as Equation (4). In Equation (4), a=−tan θ, and the value of the gradient direction component θ calculated using Equation (2) can be used.

$$y = ax + b \quad (4)$$

Figure 8:
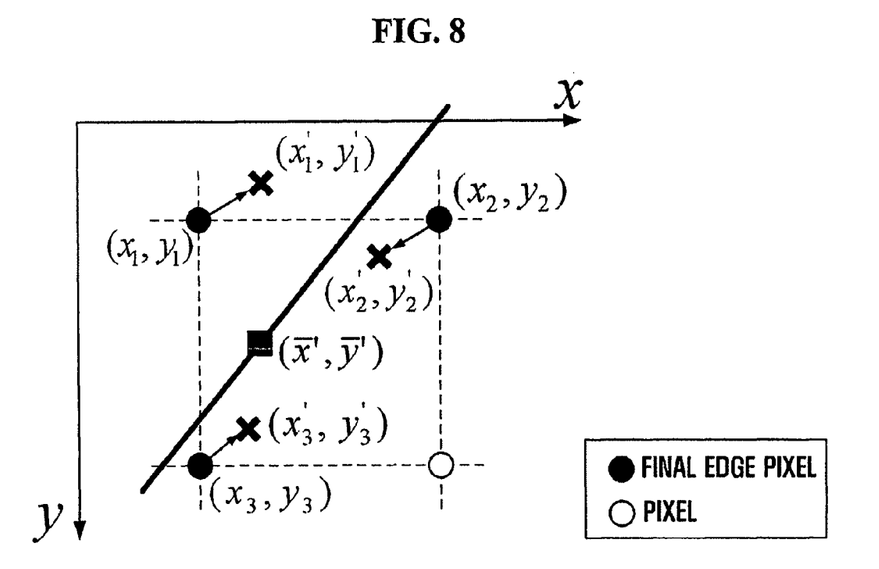
FIG. 8 is a diagram illustrating a method of estimating the position of an edge in an image with a converted resolution when there is a plurality of final edges.

Resolution conversion according to an exemplary embodiment may be performed in units of 2×2 pixel groups of an input image. If a 2×2 pixel group includes a plurality of final edge pixels, the mean of estimated position information of the final edge pixels may be used as final edge position information. FIG. 8 is a diagram illustrating a case where $(x_1, y_1)$, $(x_2, y_2)$ and $(x_3, y_3)$ in a 2×2 pixel group of $(x_1, y_1)$, $(x_2, Y_2)$, $(x_3, y_3)$ and $(x_4, y_4)$ of an input image are final edge pixels. In the case of FIG. 8, final edge position information $(\overline{x}', \overline{y}')$ can be calculated as the mean of estimated edge position information $(x_1', y_1')$, $(x_2', y_2')$ and $(x_3', y_3')$ of the final edge pixels $(x_1, y_1)$, $(x_2, Y_2)$ and $(x_3, y_3)$, respectively. Similarly, final edge direction information can be calculated as the mean of gradient direction components of final edge pixels. As described above, if the number of final edge pixels included in a 2×2 pixel group of an input image is n, final edge position information $(\overline{x}', \overline{y}')$ and final edge direction information $\overline{\theta}$ may be defined by Equation (5). In the case of FIG. 8, n=3.

$$\begin{cases} \overline{\theta} = \dfrac{1}{n} \sum_{i=1}^{n} \theta_i \\ \overline{x}' = \dfrac{1}{n} \sum_{i=1}^{n} x_i' \\ \overline{y}' = \dfrac{1}{n} \sum_{i=1}^{n} y_i' \end{cases} \quad (5)$$

The edge direction information and edge position information finally estimated using Equation (5) can be modeled by Equation (6).

$$y = -\tan \overline{\theta} x + \overline{y}' + \tan \overline{\theta} \overline{x}' \quad (6).$$

Referring to FIG. 3, the first interpolation unit 124 may perform edge directional interpolation and linear interpolation on the input image. To this end, the first interpolation unit 124 may include a first sub-interpolation unit 124-1 and a second sub-interpolation unit 124-2.

The first sub-interpolation unit 124-1 may perform edge directional interpolation on the input image in units of 2×2 pixel groups. In this case, the first sub-interpolation unit 124-1 may perform the edge directional interpolation according to the relationship between the position of a 2×2 pixel group and that of a pixel to be interpolated.

Figure 9:
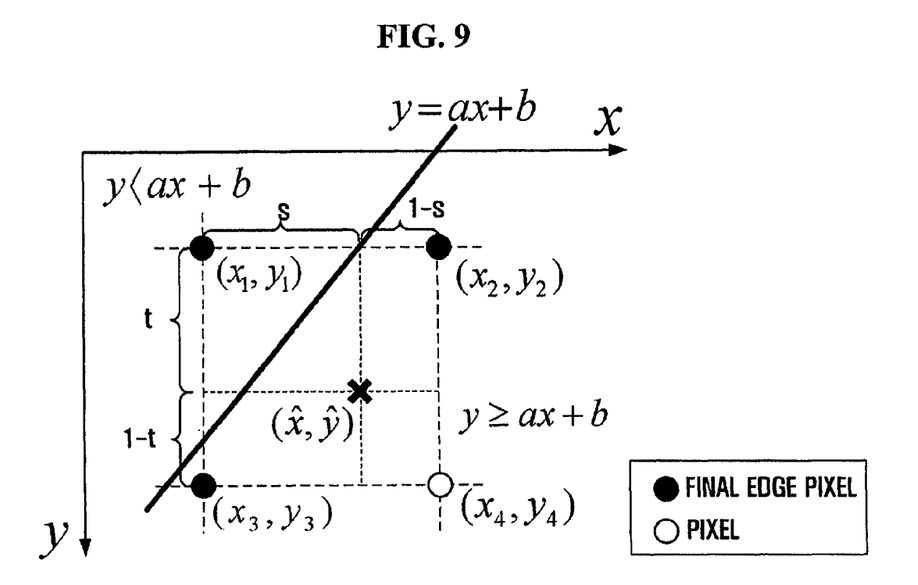
FIG. 9 is a diagram illustrating an interpolation method based on estimation edge direction information.

In order to perform the edge directional interpolation, the first sub-interpolation unit 124-1 may divide the input image into two regions (that is, a first region where y≧ax+b and a second region where y<ax+b) based on an edge direction finally estimated by the edge-information-estimation unit 123 as illustrated in FIG. 9. Then, the first sub-interpolation unit 124-1 may determine an indicator function to be applied to each pixel according to whether each pixel in the 2×2 pixel group is located in the first region or the second region. The indicator function refers to a function indicating the correlation between the position of a 2×2 pixel group and that of a pixel to be interpolated. The indicator function may have a value of 0 or 1. Equation (7) represents an indicator function $I_A(x_i, y_i)$ applied to a pixel located at $(x_i, y_i)$.

$$I_A(x_i, y_i) = \begin{cases} 1 & \text{if } (x_i, y_i) \in A, \\ 0 & \text{otherwise} \end{cases} \quad (7)$$

In Equation (7), A indicates a region (the first or second region) in which a pixel to be interpolated is located. In the case of FIG. 9, A={(x, y):y≧ax+b}. Therefore, pixels located in the first region among the pixels in the 2×2 pixel group may have one as the value of the indicator function, and pixels located in the second region may have zero as the value of the indicator function. That is, pixels located at $(x_2, y_2)$ and $(x_3, y_3)$ have one as the value of the indicator function, and pixels located at $(x_1, y_1)$ and $(x_4, y_4)$ have zero as the value of the indicator function.

As described above, if an indicator function for a 2×2 pixel group is determined, the first sub-interpolation unit 124-1 may obtain luminance information $f(\hat{x}, \hat{y})$ of a pixel at $(\hat{x}, \hat{y})$ using Equation (8).

$$f(\hat{x}, \hat{y}) = \frac{1}{w}[(1-t)(1-s)f(x_1, y_1)I_A(x_1, y_1) + (1-t)sf(x_2, y_2)I_A(x_2, y_2) + t(1-s)f(x_3, y_3)I_A(x_3, y_3) + tsf(x_4, y_4)I_A(x_4, y_4)] \quad (8)$$

In Equation (8), w indicates a normalization weight factor, which is given by Equation (9):

$$w = (1-t)(1-s)I_A(x_1,y_1) + (1-t)sI_A(x_2,y_2) + t(1-s)I_A(x_3,y_3) + tsI_A(x_4,y_4) \quad (9)$$

The result of edge directional interpolation performed as described above may be provided to the first synthesis unit 125 (described later).

Referring to FIG. 3, the second sub-interpolation unit 124-2 may perform linear interpolation, e.g., bilinear interpolation, on the input image. Specifically, in the case of FIG. 9, the second sub-interpolation unit 124-2 may calculate the mean luminance of a 2×2 pixel group and thus obtain luminance information $f(\hat{x}, \hat{y})$ of a pixel located at $(\hat{x}, \hat{y})$. The result of bilinear interpolation performed as described above may be provided to the first synthesis unit 125 (described later).

The first synthesis unit 125 may combine the result of edge direction interpolation performed by the first sub-interpolation unit 124-1 with the result of bilinear interpolation performed by the second sub-interpolation unit 124-2 and generate a first intermediate image. In order to combine the result of edge directional interpolation with the result of bilinear interpolation, the first synthesis unit 125 may use a weighted sum as in Equation (10).

$$f(x,y) = w(\bar{g})f_e(x,y) + (1-w(\bar{g}))f_b(x,y) \quad (10)$$

$f_e(x, y)$ indicates the result of edge directional interpolation, and $f_b(x, y)$ indicates the result of bilinear interpolation. In addition, $w(\bar{g})$ indicates a mean edge gradient magnitude of a 2×2 pixel group in an input image and is given by Equation (11).

$$w(\bar{g}) = \min\left(\frac{\bar{g}}{50}, 1.0\right) \quad (11)$$

As shown in Equation (11), since $w(\bar{g})$ indicates the mean edge gradient magnitude of a 2×2 pixel group in an input image, it increases as a greater number of edge pixels are included in the 2×2 pixel group of the input image. Referring to Equation (10), as $w(\bar{g})$ increases, a relatively higher weight is assigned to the result of bilinear interpolation than the result of edge directional interpolation. In addition, if the result of edge directional interpolation and that of bilinear interpolation are combined using the weighted sum as in Equation (10), contour artifacts in a smooth region can be reduced.

The second-intermediate-image-generation unit 130 illustrated in FIG. 1 will be described in detail with reference to FIGS. 10 and 11 in the following.

Figure 10:
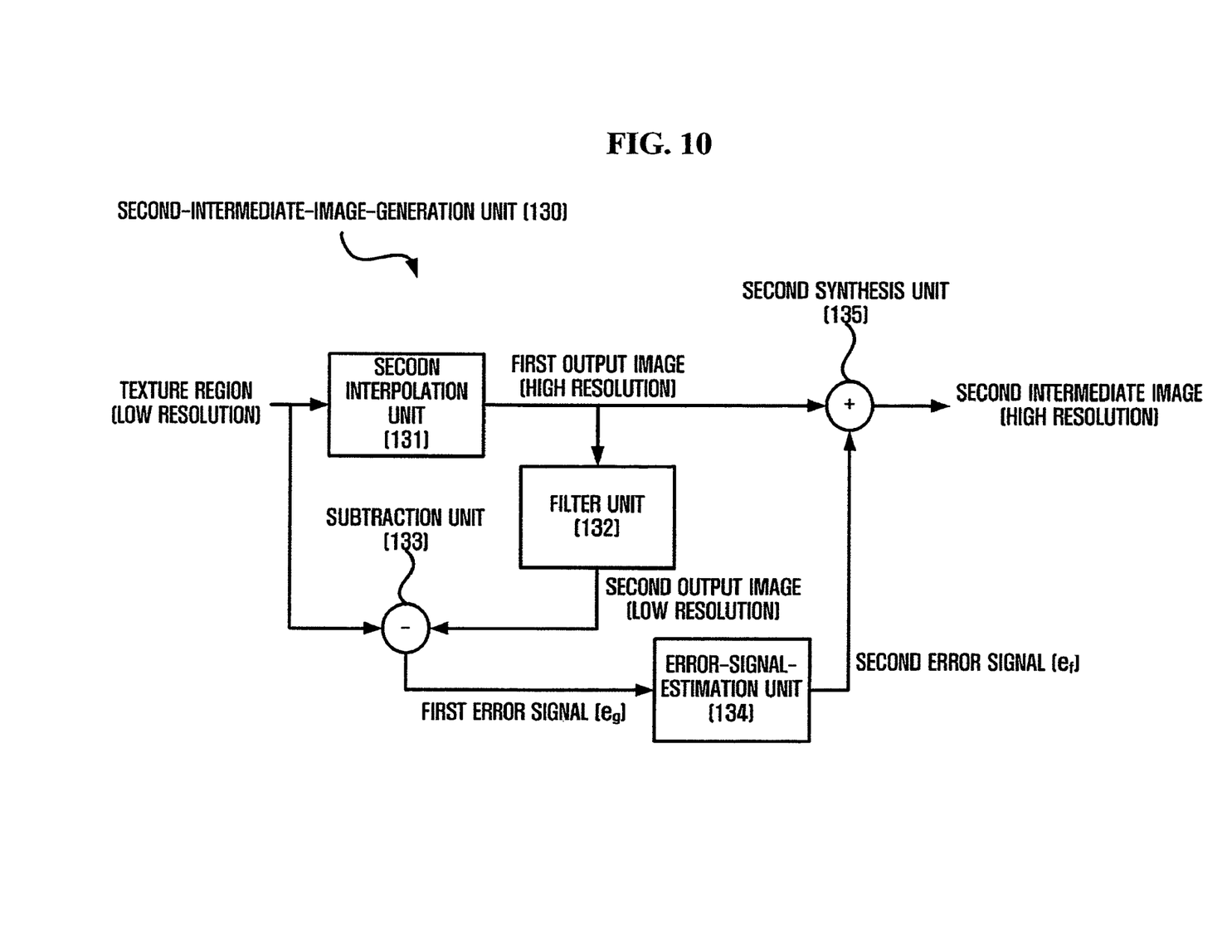
FIG. 10 is a detailed block diagram of the second-intermediate-image-generation unit illustrated in FIG. 1.
Figure 11:
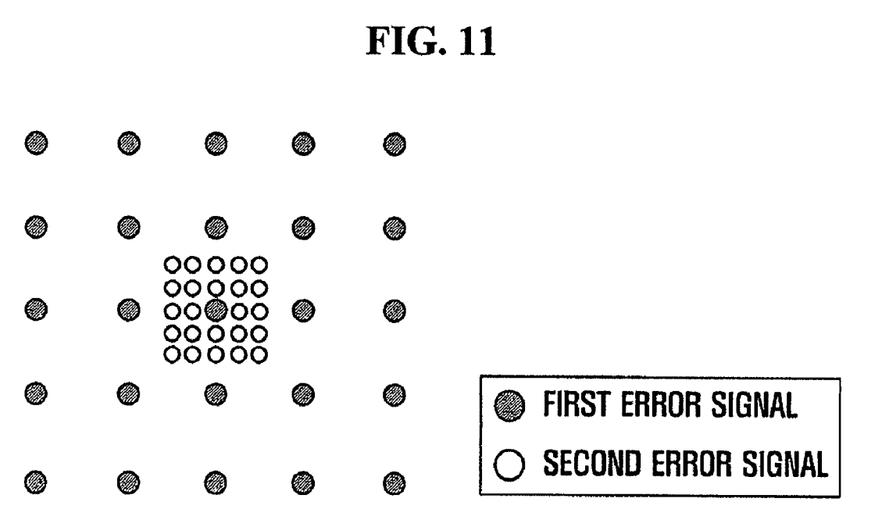
FIG. 11 is a diagram illustrating a pixel group for residual error estimation according to an exemplary embodiment.

FIG. 10 is a detailed block diagram of the second-intermediate-image-generation unit 130 illustrated in FIG. 1. Referring to FIG. 10, the second-intermediate-image-generation unit 130 may include a second interpolation unit 131, a filter unit 132, a subtraction unit 133, an error-signal-estimation unit 134, and a second synthesis unit 135.

The second interpolation unit 131 may perform linear interpolation, for example, bilinear interpolation, on an input texture region and generate a first output image with better resolution than that of the input texture region. The first output image may be provided to the filter unit 132 (described later).

The filter unit 132 may down-sample the received first output image and generate a second output image with identical resolution to that of the input texture region. In order to emphasize the detailed texture of the second output image, the filter unit 132 may be implemented as a rectangular low-pass filter (LPF) as in Equation (12). In Equation (12), S indicates a resolution conversion rate, e.g., a resolution improvement magnification, of an input image.

$$h'(n) = \begin{cases} \frac{1}{2\lfloor S \rfloor + 1}, & n = -\lfloor S \rfloor, \ldots \lfloor S \rfloor \\ 0, & \text{otherwise} \end{cases} \quad (12)$$

The subtraction unit 133 may subtract the second output image provided by the filter unit 132 from the input texture region, and output a first error signal $e_g$, which is a residual error signal when the resolution of the texture region is low.

The error-signal-estimation unit 134 may estimate a residual error signal when resolution of the texture region has improved, that is, a second error signal $e_f$, based on the first error signal $e_g$. For operational efficiency, the first and second error signals $e_g$ and $e_f$ may be formed based on a local window. Specifically, when a resolution improvement magnification is S (e.g. S=5), if $e_g$ indicates a W×W (e.g. W=5) first error signal (hatched pixels in FIG. 11) and $e_f$ indicates an S×S second error signal (unhatched pixels in FIG. 11), the second error signal ef may be estimated using Equation (13).

$$e_f = Ge_g + v, \quad (13)$$

where G indicates an $S^2 \times W^2$ transformation matrix, and v indicates an $S^2 \times 1$ noise component. G and v can be obtained in a prior training process. Specifically, they can be calculated in the process of optimizing a minimum mean square error (MMSE) as in Equation (14):

$$\hat{G} = E_f E_g^T (E_g E_g^T)^{-1} \quad (14)$$

$$\hat{v} = \frac{1}{N} \sum_{i=1}^{N} (e_{fi} - \hat{G} e_{gi})$$

The second synthesis unit 135 may add the second error signal provided by the error-signal-estimation unit 134 to the first output image provided by the second interpolation unit and generate a second intermediate image. The second intermediate image may be provided to the final-image-generation unit 140 of the image-resolution-improvement apparatus 100.

Figure 12:
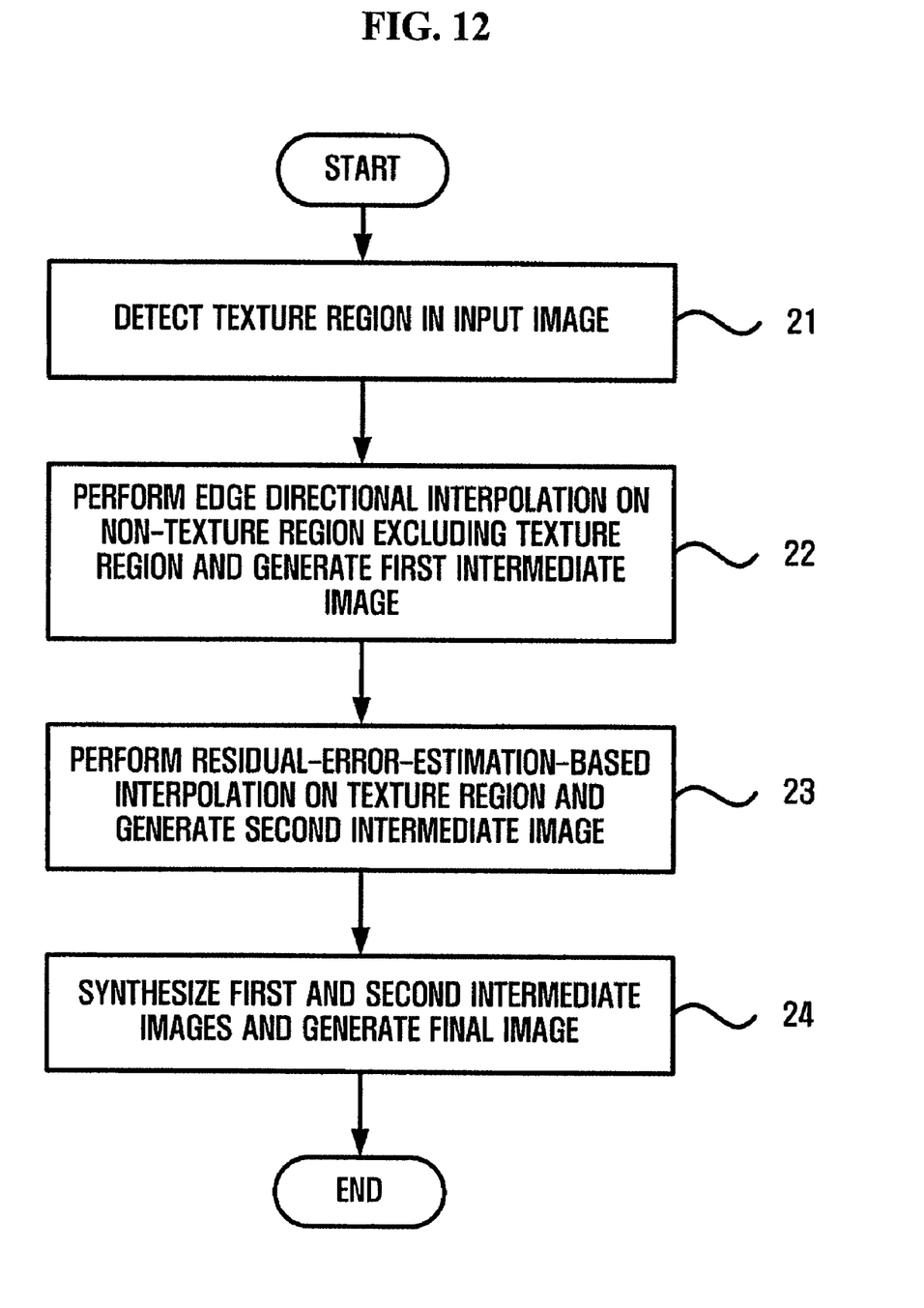
FIG. 12 is a flowchart illustrating an image-resolution-improvement method according to an exemplary embodiment.

FIG. 12 is a flowchart illustrating an image-resolution-improvement method according to an exemplary embodiment.

Referring to FIG. 12, the image-resolution-improvement method includes detecting a texture region in an input image (operation 21), performing edge directional interpolation on a non-texture region excluding the texture region, generating a first intermediate image (operation 22), performing residual error estimation-based interpolation on the texture region, generating a second intermediate image (operation 23), and synthesizing the first and second intermediate images and generating a final image (operation 24).

The detecting of the texture region (operation 21) may be performed by determining a central pixel to be a texture pixel when the number of pixels whose luminance differences from the central pixel in a predetermined window mask are less than a first threshold value is greater than a second threshold value.

The generating of the first intermediate image (operation 22) may include detecting edges in the non-texture region, thinning the detected edges, estimating edge direction information and edge position information in the non-texture region with improved resolution based on direction information of a final edge pixel which is selected through the edge thinning and luminance of the final edge pixel and those of pixels existing around the final edge pixel, and determining an indicator function to be applied to a 2×2 pixel group of the non-texture region based on the estimated direction information and performing interpolation.

The generating of the second intermediate image (operation 23) may include generating a first output image with improved resolution by performing linear interpolation on the texture region, downsampling the first output image and generating a second output image with identical resolution to that of the texture region, calculating a first error signal, which is a residual error signal when resolution of the texture region is low, by subtracting the second output image from the texture region, estimating a second error signal, which is an error signal when resolution of the texture region has improved, based on the first error signal, and adding the estimated second error signal to the first output image and generating a second intermediate image.

Figure 13:
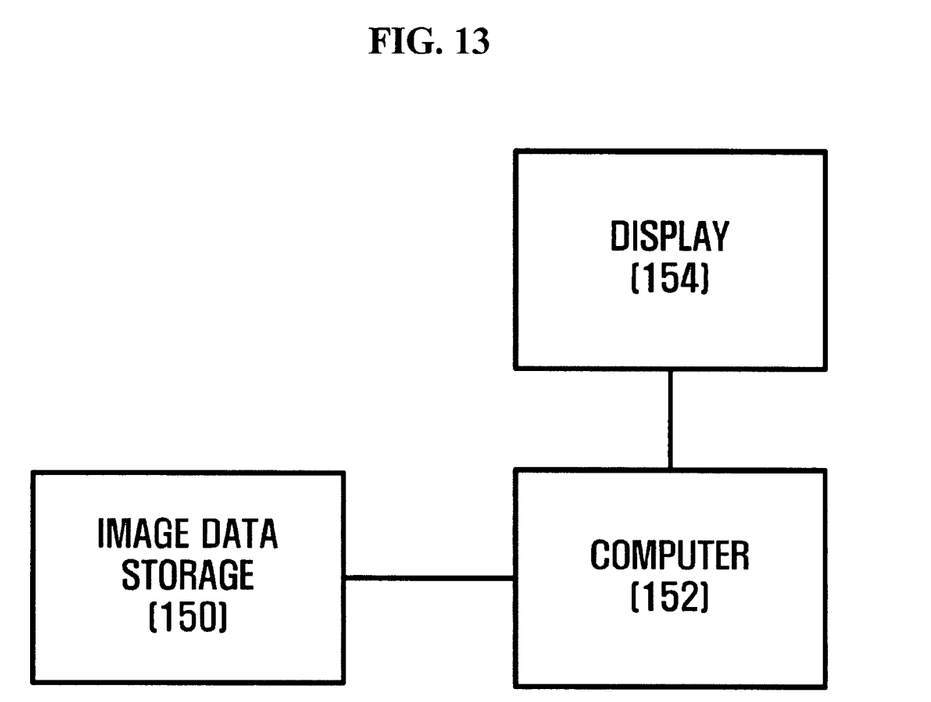
FIG. 13 is a diagram illustrating another exemplary embodiment.

FIG. 13 depicts an embodiment where the image data from a storage 150 is processed by a computer 152 according to the operations discussed previously herein and the final image is displayed on a display 154.

As described above, an image-resolution-improvement apparatus and method can improve the resolution of both textured and non-texture regions of an input image. Therefore, a high-quality final image can be obtained.

While the present invention has been particularly shown and described with reference to exemplary embodiments thereof, it will be understood by those of ordinary skill in the art that various changes in form and detail may be made therein without departing from the spirit and scope of the present invention as defined by the following claims.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An image-resolution-improvement apparatus, comprising:
   a computer comprising:
   a textured-region-detection unit to detect a texture region of an input image; and
   a final-image-generation unit to synthesize a first intermediate image and a second intermediate image, which are obtained by applying different interpolation techniques to the texture region and a non-texture region excluding the texture region, and generating a final image,
   wherein the first intermediate image is obtained by applying an edge directional interpolation technique to the non-texture region, and the second intermediate image is obtained by applying an residual error estimation-based interpolation technique to the texture region.

2. The apparatus of claim 1, wherein the textured-region-detection unit determines a central pixel to be a texture pixel included in the texture region when the number of pixels whose luminance differences from the central pixel in an M×N window mask are less than a first threshold value and greater than a second threshold value.

3. The apparatus of claim 2, wherein the M=N.

4. The apparatus of claim 1, wherein the first-intermediate-image-generation unit comprises:
   an edge detection unit to detect edges in the non-texture region;
   an edge-thinning unit to thin the detected edges;
   an edge-information-estimation unit to estimate edge direction information and edge position information in the non-texture region with improved resolution based on information of a final edge pixel selected by the edge-thinning unit; and
   a first interpolation unit to determine an indicator function, which is to be applied to a 2×2 pixel group of the non-texture region, according to the estimation edge direction information, and to perform interpolation.

5. The apparatus of claim 4, wherein the edge detection unit determines a pixel having an edge gradient magnitude, which is greater than a predetermined threshold value, among pixels included in the non-texture region to be an edge pixel.

6. The apparatus of claim 5, wherein the edge-thinning unit determines the edge pixel to be the final edge pixel when the edge gradient magnitude of the edge pixel is greater than those of its neighboring pixels.

7. The apparatus of claim 6, wherein the neighboring pixels are pixels disposed on both sides of the edge pixel among pixels existing in a direction of the edge pixel.

8. The apparatus of claim 4, wherein the edge-information-estimation unit estimates a position, which is calculated based on the mean luminance of pixels horizontally arranged from the final edge pixel and the mean luminance of pixels vertically arranged from the final edge pixel, to be the edge position information in the non-texture region with improved resolution.

9. The apparatus of claim 4, wherein, if the 2×2 pixel group includes a plurality of final edge pixels, the edge-information-estimation unit estimates the mean of estimated positions of the final edge pixels to be the edge position information in the non-texture region with improved resolution, and estimates the mean of gradient direction components of the final edge pixels to be the edge direction information in the non-texture region with improved resolution.

10. The apparatus of claim 4, wherein the indicator function indicates the correlation between the position of the 2×2 pixel group and that of a pixel to be interpolated.

11. The apparatus of claim 10, wherein, when the texture region is divided into first and second regions based on the estimated edge direction information, the first interpolation unit sets a value of the indicator function to "1" and applies the set value to the 2×2 pixel group if the 2×2 pixel group is located in the same region as the pixel to be interpolated, sets the value of the indicator function to "0", and applies the set value to the 2×2 pixel group if the 2×2 pixel group is not located in the same region as the pixel to be interpolated.

12. The apparatus of claim 4, wherein the first-intermediate-image-generation unit further comprises a first synthesis unit that generates the first intermediate image based on a weighted sum of a first result, which is obtained after the first interpolation unit performs interpolation, and a second result, which is obtained after the first interpolation unit performed linear interpolation in units of 2×2 pixel groups.

13. The apparatus of claim 1, wherein the second-intermediate-image-generation unit comprises:
 a filter unit which downsamples a first output image obtained by performing linear interpolation on the texture region, and generating a second output image having identical resolution to that of the input image;
 a subtraction unit which subtracts the second output image from the texture region and outputting a first error signal which is an error signal when the resolution of the texture region is identical to that of the input image;
 an error-signal-estimation unit that applies a pre-stored mask to the first error signal, adds a noise component to the first error signal, and estimates a second error signal when the resolution of the texture region is identical to that of the first output image; and
 a second synthesis unit that adds the second error signal to the first output image and generates the second intermediate image.

14. The apparatus of claim 13, wherein, if the size of the first error signal is W×W and the size of the second error signal is S×S, the mask has a size of S2×W2, and the noise component has a size of S2×1, wherein S and W are real numbers.

15. An image-resolution-improvement method, comprising:
 detecting a texture region in an input image; and
 synthesizing a first intermediate image and a second intermediate image, which are obtained by applying different interpolation techniques to the texture region and a non-texture region excluding the texture region, and generating a final image,
 wherein the first intermediate image is obtained by applying an edge directional interpolation technique to the non-texture region, and the second intermediate image is obtained by applying an residual error estimation-based interpolation technique to the texture region.

16. The method of claim 15, wherein the detecting of the texture region comprises determining a central pixel to be a texture pixel included in the texture region when the number of pixels whose luminance differences from the central pixel in an M×N window mask is less than a first threshold value and greater than a second threshold value.

17. The method of claim 16, wherein M=N.

18. The method of claim 15, wherein the generating of the first intermediate image comprises:
 detecting edges in the non-texture region;
 thining the detected edges;
 estimating edge direction information and edge position information in the non-texture region with improved resolution based on information of a final edge pixel selected in the thining of the detected edges; and
 determining an indicator function, which is to be applied to a 2×2 pixel group of the non-texture region, according to the estimation-edge-direction information and the interpolation.

19. The method of claim 18, wherein the detecting of the edges comprises determining a pixel having an edge gradient magnitude that is greater than a predetermined threshold value among pixels included in the non-texture region to be an edge pixel.

20. The method of claim 19, wherein the thining of the detected edges comprises determining the edge pixel to be the final edge pixel when the edge gradient magnitude of the edge pixel is greater than those of its neighboring pixels.

21. The method of claim 20, wherein the neighboring pixels are pixels disposed on both sides of the edge pixel among pixels existing in a direction of the edge pixel.

22. The method of claim 18, wherein the estimating of the edge direction information and the edge position information comprises estimating a position, which is calculated based on the mean luminance of pixels horizontally arranged from the final edge pixel and the mean luminance of pixels vertically arranged from the final edge pixel, to be the edge position information in the non-texture region with improved resolution.

23. The method of claim 18, wherein, if the 2×2 pixel group includes a plurality of final edge pixels, the estimating of the edge direction information and the edge position information comprises:
 estimating the mean of estimated positions of the final edge pixels to be the edge position information in the non-texture region with improved resolution; and
 estimating the mean of gradient direction components of the final edge pixels to be the edge direction information in the non-texture region with improved resolution.

24. The method of claim 18, wherein the indicator function indicates the correlation between the position of the 2×2 pixel group and that of a pixel to be interpolated.

25. The method of claim 24, wherein the determining of the indicator function and the performing of the interpolation comprises:
 dividing the texture region into first and second regions based on the estimated edge direction information;
 setting a value of the indicator function to one and applying the set value to the 2×2 pixel group if the 2×2 pixel group is located in the same region as the pixel to be interpolated; and
 setting the value of the indicator function to zero and applying the set value to the 2×2 pixel group if the 2×2 pixel group is not located in the same region as the pixel to be interpolated.

26. The method of claim 18, wherein the generating of the first intermediate image further comprises generating the first intermediate image based on a weighted sum of a first result, which is obtained after the performing of the interpolation, and a second result which is obtained after linear interpolation is performed in units of 2×2 pixel groups.

27. The method of claim 15, wherein the generating of the second intermediate image comprises:
 downsampling a first output image obtained by performing linear interpolation on the texture region, and generating a second output image having identical resolution to that of the input image;
 subtracting the second output image from the texture region and outputting a first error signal which is an error signal when the resolution of the texture region is identical to that of the input image;
 applying a pre-stored mask to the first error signal, adding a noise component to the first error signal, and estimating a second error signal which is an error signal when a resolution of the texture region is identical to that the resolution of the texture region of the first output image; and adding the second error signal to the first output image and generating the second intermediate image.

28. The method of claim 27, wherein, if the size of the first error signal is W×W and the size of the second error signal is S×S, the mask has a size of S2×W2, and the noise component has a size of S2×1, wherein S and W are real numbers.

29. A method, comprising:
  detecting a texture region of image data; and
  producing an image with the texture region having pixels produced by a first interpolation technique and with a non-texture region having pixels produced by a second interpolation technique different than the first interpolation technique,
  wherein the first intermediate image is obtained by applying an edge directional interpolation technique to the non-texture region, and the second intermediate image is obtained by applying an residual error estimation-based interpolation technique to the texture region.

30. An apparatus, comprising:
  a processor receiving image data, detecting a texture region of the image data, and
  producing an image with the texture region produced by a first interpolation technique and with a non-texture region produced by a second interpolation technique; and
  a display displaying the image,
  wherein the first intermediate image is obtained by applying an edge directional interpolation technique to the non-texture region, and the second intermediate image is obtained by applying an residual error estimation-based interpolation technique to the texture region.

* * * * *

UNITED STATES PATENT AND TRADEMARK OFFICE
CERTIFICATE OF CORRECTION

PATENT NO. : 8,233,748 B2
APPLICATION NO. : 11/878147
DATED : July 31, 2012
INVENTOR(S) : Ho-young Lee et al.

It is certified that error appears in the above-identified patent and that said Letters Patent is hereby corrected as shown below:

In the Claims

Column 11; Line 31; In Claim 14, delete "S2 × W2," and insert -- $S^2 \times W^2$, --, therefor.

Column 11; Line 32; In Claim 14, delete "S2 × 1," and insert -- $S^2 \times 1$, --, therefor.

Column 13; Line 5; In Claim 28, delete "S2 × W2," and insert -- $S^2 \times W^2$, --, therefor.

Column 13; Line 6; In Claim 28, delete "S2 × 1," and insert -- $S^2 \times 1$, --, therefor.

Signed and Sealed this
Fourteenth Day of May, 2013

Teresa Stanek Rea
*Acting Director of the United States Patent and Trademark Office*